United States Patent
Smith

(10) Patent No.: US 9,378,483 B1
(45) Date of Patent: Jun. 28, 2016

(54) TRACKING MODULATION/DEMODULATION FOR DATA LIBRARY COMMUNICATIONS

(71) Applicant: Oracle International Corporation, Redwood City, CA (US)

(72) Inventor: Frank Smith, Nederland, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/820,341

(22) Filed: Aug. 6, 2015

(51) Int. Cl.
*G06F 7/00* (2006.01)
*G06Q 10/08* (2012.01)

(52) U.S. Cl.
CPC .................................... *G06Q 10/087* (2013.01)

(58) Field of Classification Search
None
See application file for complete search history.

(56) References Cited

U.S. PATENT DOCUMENTS

| | | | | |
|---|---|---|---|---|
| 2009/0201152 A1* | 8/2009 | Karr | ............................ | G01S 5/14 340/545.6 |
| 2010/0066531 A1* | 3/2010 | Karr | ........................ | G06Q 10/00 340/539.1 |
| 2013/0142218 A1* | 6/2013 | Moradi | .................. | H04B 1/707 375/135 |

* cited by examiner

*Primary Examiner* — Yolanda Cumbess
(74) *Attorney, Agent, or Firm* — Marsh Fischmann & Breyfogle LLP; Daniel J. Sherwinter

(57) ABSTRACT

Embodiments include systems and methods for improving electromagnetic compatibility of a data storage library to meet electromagnetic interference (EMI) requirements. Embodiments can operate in context of a data storage library having one or more robots to ferry storage media between media cells and media drives. The robot(s) can communicate with a controller system via a communications link using respective drivers, thereby employing coordinated-spread-spectrum, frequency-shifted keying (FSK) signals. For example, a transmitting driver can modulate instruction data into an FSK signal and transmit the FSK signal over a predefined spread-spectrum carrier signal; and a receiving driver can receive the FSK signal on the predefined spread-spectrum carrier signal and demodulating the FSK signal to recover the instruction data. This can spread EMI over multiple carrier frequencies, thereby reducing the power spectral density of the emissions, and reducing the EMI level at particular frequencies to below a predefined limit.

20 Claims, 3 Drawing Sheets

TRACKING MODULATION/DEMODULATION FOR DATA LIBRARY COMMUNICATIONS

FIELD

Embodiments relate generally to large data storage libraries, and, more particularly, to techniques for improving electromagnetic performance of data storage libraries using tracking modulation and demodulation.

BACKGROUND

Many data storage environments include large libraries in which data is stored on large numbers of media and accessed using robots and other electromagnetic components. For example, a large tape storage library may have thousands of data tapes arranged in slots of magazines, and multiple tape drives and/or other components for reading data from, and writing data to, the data tapes. When a library user logically accesses data stored on a data tape, a robot can be instructed to ride along rails and/or other support structure to physically visit the location (i.e., the magazine slot) of the invoked data tape, a mechanical hand of the robot can pick the data tape from its magazine slot, the robot can deliver the data tape to (and load the data tape in) a tape drive, and the tape drive can perform read and/or write operations as instructed by the user.

Various data storage library operations, such as operations involving the robot, can involve sending instructions to the robot and/or other components via communications links (e.g., as alternating current (AC) signals over a direct current (DC) rail or bus). Such communications can produce electromagnetic radiation, which can manifest as electromagnetic interference (EMI). Typically, data storage libraries are tested to ensure they do not exceed a certain defined level of EMI, for example, that they do not exceed a certain level of electromagnetic radiation at any particular frequency. To this end, data storage libraries are often surrounded by conductive enclosures (e.g., sheet metal or other enclosures to act substantially as a Faraday cage) reduce EMI leakage from the library components. Unfortunately, such approaches can be expensive and/or insufficient. For example, EMI can still typically leak from components of the library through seams in the enclosure; and related currents can develop on, and radiate from, the conductive enclosure (e.g., the enclosure can act as a large ground plane or a least-impedance signal return path). Thus, library designers are often driven to use expensive components (e.g., special cables, connectors, etc.) and/or expensive enclosure designs to sufficiently reduce EMI, which can add appreciable complexity and expense to the library implementation.

BRIEF SUMMARY

Among other things, embodiments provide novel systems and methods for implementing data storage libraries to meet electromagnetic interference (EMI) requirements. For example, embodiments can operate without relying on expensive EMI shielding, or the like. Some embodiments operate in context of a data storage library having data storage media (e.g., data tapes) accessible using a robotic pick and place system. The robotic system includes robots and/or other components that communicate with a controller system via a communications link (e.g., using alternating current (AC) signals over a direct current (DC) rail). Each of the controller system and the robotic system includes a driver, and the drivers use coordinated-spread-spectrum, frequency-shifted keying (FSK) for their communications. For example, the controller system driver can communicate an instruction by modulating the instruction data into an FSK signal and transmitting the FSK signal over a predefined spread-spectrum carrier signal; and the robotic system driver can recover the instruction by receiving the FSK signal on the predefined spread-spectrum carrier signal and demodulating the FSK signal into the instruction data. Such an approach can spread the EMI over multiple carrier frequencies, thereby reducing the power spectral density of the signal, and reducing the EMI level at any single frequency to below a predefined limit.

According to one set of embodiments, a data storage library system is provided. The system includes a library controller subsystem that operates to direct operation of a robotic controller subsystem according to instructions. The library controller subsystem includes a transmitter driver that operates to: modulate the instructions into a frequency shift keying (FSK) signal according to a spread-spectrum carrier signal; and transmit the FSK signal to the robotic controller subsystem via a communications link. Some such embodiments further include a robotic controller subsystem that operates to ferry a plurality of storage media between media cells and media drives. The robotic controller subsystem includes a receiver driver that operates to: track the spread-spectrum carrier signal to determine a spread-spectrum schema; receive the FSK signal via the communications link according to the spread-spectrum schema; and demodulate the FSK signal to recover the instructions.

According to another set of embodiments, a method is provided for improving electromagnetic compatibility of a data storage library. The method includes: modulating instruction data, by a library controller of the data storage library, into a frequency shift keying (FSK) signal according to a spread-spectrum carrier signal; transmitting the FSK signal from the library controller to a robotic controller of the data storage library via a communications link; tracking the spread-spectrum carrier signal by the robotic controller to determine a spread-spectrum schema; receiving the FSK signal via the communications link by the robotic controller according to the spread-spectrum schema; and demodulating the FSK signal by the robotic controller to recover the instruction data.

According to another set of embodiments, another data storage library system is provided. The system includes a library controller that has: a non-transient data store having first instructions stored thereon; and a processor that operates to execute the first instructions to direct operation of a robotic controller of a data storage library by performing steps including: receiving second instructions; modulating the second instructions into a frequency shift keying (FSK) signal according to a spread-spectrum signal that follows a predefined spread-spectrum schema; and transmitting the FSK signal to the robotic controller via a direct current (DC) communications link. Some such embodiments further include the robotic controller, and the robotic controller has: another non-transient data store having third instructions stored thereon; and another processor that operates to execute the third instructions to perform steps including: receiving the FSK signal via the communications link according to the spread-spectrum schema; demodulating the FSK signal to recover the second instructions; and operating a robot according to the second instructions to ferry storage media between at least one media cell and at least one media drive.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
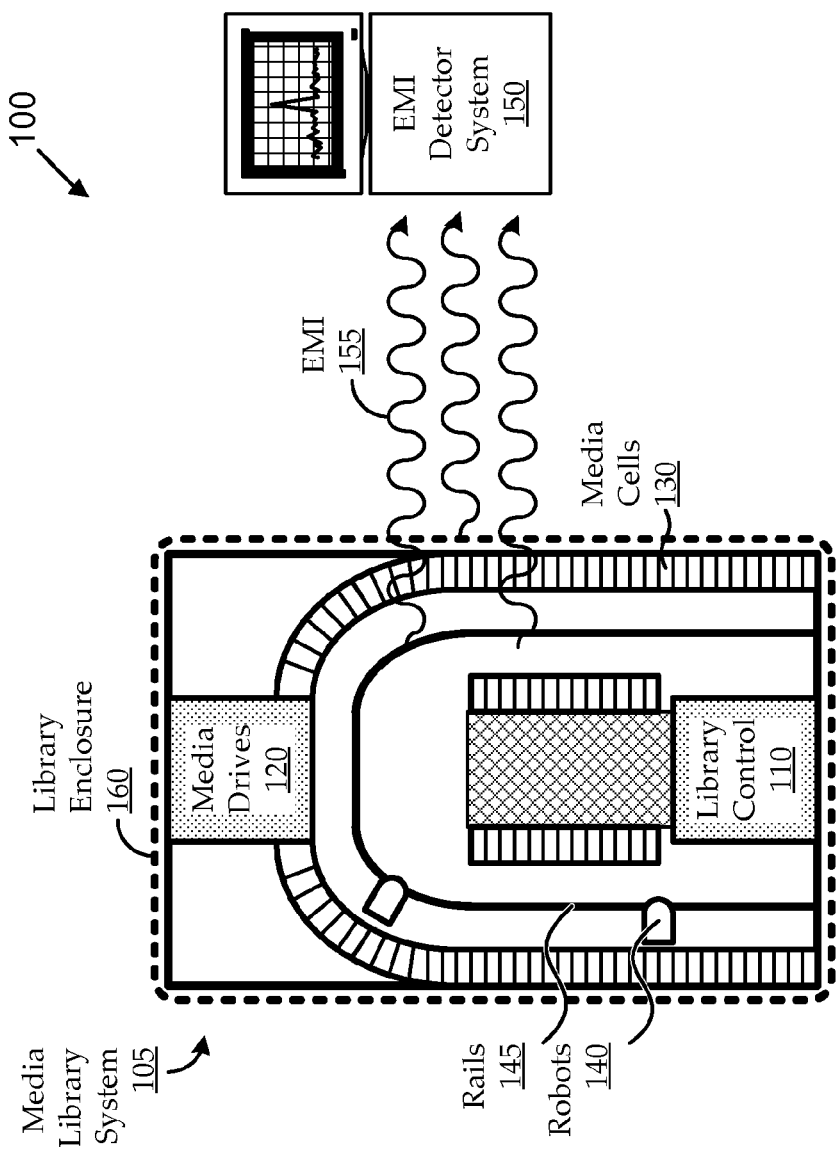
FIG. 1 shows an illustrative media library testing environment as context for various embodiments.

Turning first to FIG. 1, an illustrative media library testing environment 100 is shown as context for various embodiments. The environment 100 includes a media library system 105 that produces electromagnetic interference (EMI) (e.g., electromagnetic radiation at one or more frequencies that could potentially cause interference with surrounding electronics), and an EMI detector system 150 for detecting the EMI at one or more frequencies. The illustrated media library system 105 includes arrays of multiple media cells 130 (e.g., magazine slots) housing storage media (e.g., thousands of tape cartridges). One or more robots 140 can be used to ferry the storage media between the media slots 130 and one or more media drives 120 used to perform read/write operations on the storage media. The media library system 105 can include one or more library controller subsystems 110 for controlling library user interfaces, robot 140 operations, media drive 120 operations, maintenance and diagnostics functions, etc. The library controller subsystems 110 can be implemented as any suitable hardware and/or software components.

Various media library system 105 operations, such as operations involving the robot(s) 140, can involve sending power and/or instructions to the robot(s) 140 and/or other components via communications links (e.g., as alternating current (AC) signals over cables, direct current (DC) rails or busses, etc.). For example, operation of the robot(s) 140 in the media library system 105 can involve maintaining power to the robot(s) 140 as they move throughout the media library system 105, and communicating instructions to (and receiving feedback from) the robot(s) 140 as they perform pick and place operations involving the storage media. Such power and communications can be distributed to components of the media library system 105 using various techniques, such as by wired (e.g., cable) connections, wireless communications, brush and wiper technology, etc. For example, robot(s) 140 traveling over a given route can use a power distributor, such as fixed conductive strips (e.g., a 48-volt DC rail), to supply power to the robot(s) 140, which include brushes or wipers that contact the conductive strips to conduct power to the robot(s) 140. Such techniques can permit greater freedom of movement for the robot(s) 140, increased modularity and/or expandability (e.g., for modular and extensible power distribution as library configurations change), etc. In some such approaches, the conductive strips (e.g., the oppositely charged conductive layers of a power strip) can be used for communicating signals between the library controller subsystems 110 and the robot(s) 140.

When distributing power and communications throughout the media library system 105, electromagnetic radiation can leak from (and into) the components (e.g., particularly when involving long cables, conductive strips, etc.). Such radiation can manifest as EMI 155 and other unintended signal emissions, which can cause interference to, and/or be subject to interference from, other electromagnetic radiators. The EMI 155 can cause various issues, such as modulation of signals onto the power conductors, which can manifest data transmission errors, slow data transfer rates, etc. For these and other reasons, EMI 155 levels are often regulated, including by government agencies, certification agencies, etc. Accordingly, prior to delivering a media library system 105 to consumers, the media library system 105 is typically tested to determine ensure that EMI radiating from the media library system 105 does not exceed predetermined threshold levels.

For example, as illustrated, the media library testing environment 100 can include an EMI detector system 150, which can detect EMI 155 of a media library system 105. EMI detector systems 150 tend generally to operate by sweeping through a number of frequencies to detect a level of EMI 155 being emitted from the media library system 105 at each frequency. For example, a "peak detector" or a "quasi-peak detector" can be used for EMI 155 detection. In such EMI detector systems 150, the EMI 155 causes a voltage impulse to be received by a narrow-band receiver, thereby producing a short-duration burst oscillating at the center frequency of the narrow-band receiver. Circuitry (e.g., rectifiers, filters, etc.) can be used to extract a baseband signal from the received burst, which can effectively form a series of impulses. Passing the impulses to further circuitry that charges quickly and has long decay (e.g., a lossy integrator) can cause the detected output to rise as the impulse rate increases. By sweeping through multiples frequencies, the EMI detector system 150 can thereby detect respective levels of EMI 155 over the multiple frequencies.

Typically, much of the communications in the media library system 105 can be superimposed on a particular carrier frequency (e.g., 5.5 MHz). In context of such a media library system 105, the EMI detector system 150 will detect a relatively large amount of EMI 155 at that carrier frequency. In an attempt to reduce the EMI 155 of the media library system 105 at one or more frequencies (e.g., the carrier frequency), various techniques are conventionally employed. One such technique is to use expensive components, such as ferrite products and shielded cables, shielded connectors, EMI gasketing, etc., which can reduce the amount of EMI 155 leakage from those components. Another such technique is to enclose the media library system 105 with a library enclosure 160. For example, the library enclosure 160 can be implemented with a conductive material (e.g., sheet metal, etc.), and carefully sealed, to act as an EMI 155 shield (e.g., similar to a Faraday cage, or the like). While such library enclosures 160 can reduce EMI 155 entering and/or leaving the media library system 105, EMI 155 tends to escape through seams and other openings in the enclosure. Accordingly, these and other approaches to reducing EMI 155 can often add expense and complexity to the media library system 105, and may still be insufficient to reduce the detected EMI 155 to acceptable levels.

Embodiments provide novel systems and methods for implementing data storage libraries to meet EMI 155 testing limits without relying on special enclosures or specially shielded components (though such enclosures and/or special components can also be included in some implementations). To that end, embodiments use coordinated drivers (e.g., modulators and demodulators) in the library controller subsystems 110 and the controllers of the robot(s) 140 to implement coordinated-spread-spectrum, frequency-shifted keying (FSK) communications. For example, a controller system driver (in the library controller subsystems 110) can communicate an instruction by modulating the instruction data into an FSK signal and transmitting the FSK signal over a predefined spread-spectrum carrier signal. A robotic system driver (e.g., in each robot(s) 140) can recover the instruction by receiving the FSK signal on the predefined spread-spectrum carrier signal and demodulating the FSK signal into the instruction data.

As used herein, "frequency-shifted keying," or "FSK," is intended to broadly include any suitable encoding of binary data into frequency-coded data. For example, traditional FSK can typically convert logical '0's and '1's into two respective frequencies (e.g., 5.5 MHz and 6.6 MHz) by modulating a carrier, etc. However, FSK is used herein in conjunction with spread-spectrum techniques, and can be adapted to exploit the spread-spectrum in any suitable manner. For example, one spread-spectrum FSK technique can step through a particular sequence of frequencies in a first band when representing a '0', and can step through a corresponding or different sequence of frequencies in a second band when representing a '1'. Another spread-spectrum FSK technique can step through a first pattern of frequencies when representing a '0', and can step through a different sequence of the same or different frequencies (e.g., in the same or a different one or more bands) when representing a '1'. Another spread-spectrum FSK technique can use a particular frequency, pattern, etc. to represent a '1' or a '0', and use an absence of that frequency or pattern (or an absence of any frequency, such as a DC signal) to represent the other logical value. Using these and/or other techniques, the EMI 155 can be spread over a range of frequencies. For example, even if the same total electromagnetic radiation leaks from the media library system 105, the radiation is spread over a range of carrier frequencies, thereby reducing the power spectral density of the signal, and reducing the detected EMI 155 level at any single frequency to below the predefined testing limit.

Figure 2:
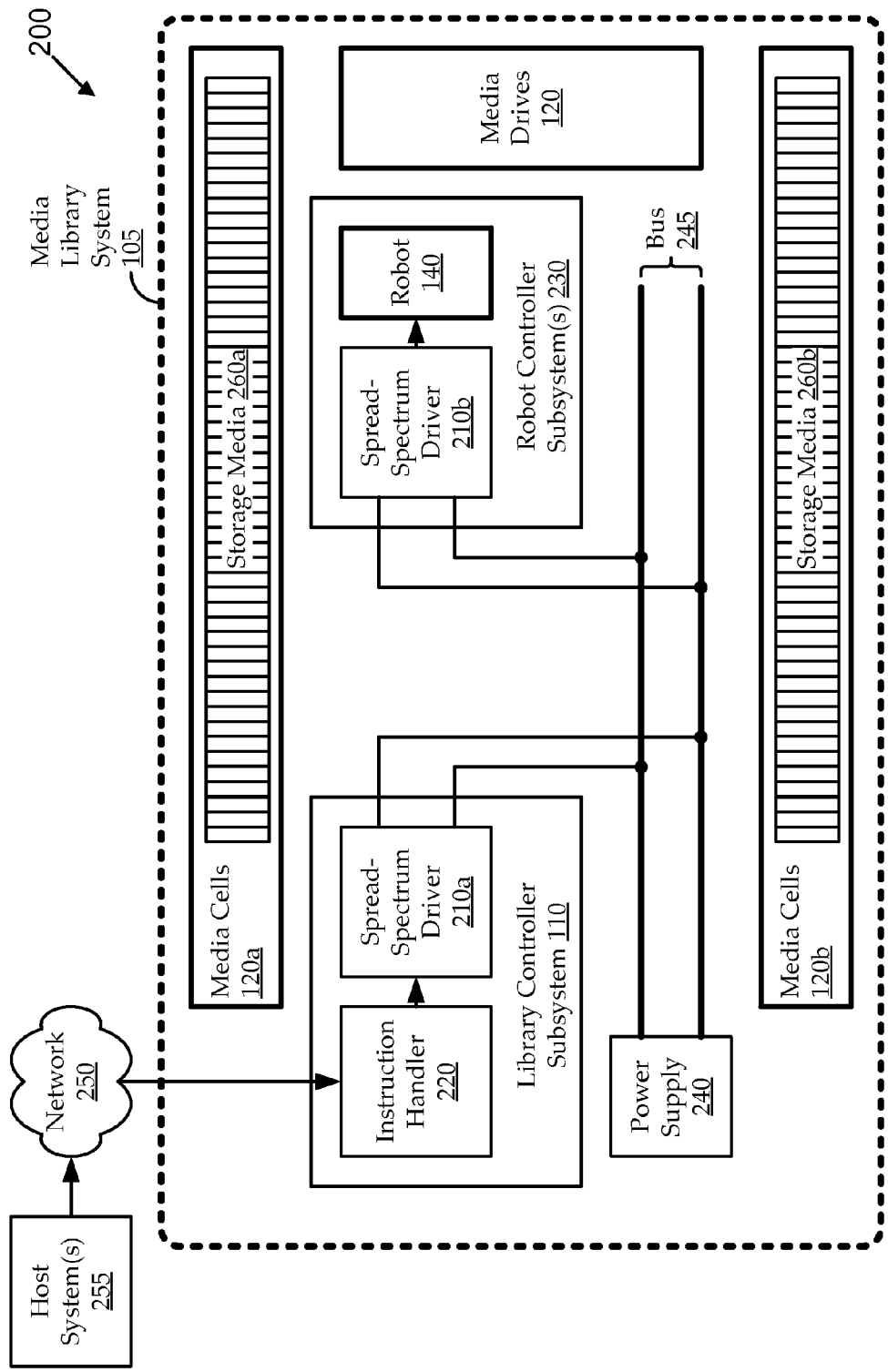
FIG. 2 shows a block diagram of an illustrative media library environment, according to various embodiments.

FIG. 2 shows a block diagram of an illustrative media library environment 200, according to various embodiments. The media library system 105 can include arrays of multiple media cells 130 (e.g., magazine slots) housing storage media 260 (e.g., thousands of tape cartridges), one or more robot controller subsystems 230 (controlling one or more robots 140) to ferry the storage media between the media cells 130 and one or more media drives 120, and one or more library controller subsystems 110 for controlling library functions (e.g., user interfaces, robot 140 operations, media drive 120 operations, maintenance and diagnostics functions, etc.). Embodiments further include one or more power supplies 240 that provide power to various components (e.g., the library controller subsystems 110, robot controller subsystems 230, media drives 120 etc.) via one or more busses 245. The busses 245 can further be used to carry communications, such as instructions communicated from the library controller subsystems 110 to direct operation of the robot controller subsystems 230. While FIG. 2 shows a single library controller subsystem 110 and a sing robot controller subsystem 230 on a single bus 245, embodiments can operate in context of any suitable number of library controller subsystems 110, robot controller subsystems 230, and/or other systems (e.g., drive controllers, interface controllers, power controllers, etc.) in communication via any suitable number of busses 245. Further, while embodiments are described in context of communications from a library controller subsystems 110 to a robot controller subsystem 230, similar or identical functionality can be applied to any similar communications throughout the library such as from one or more robot controller subsystems 230a to one or more library controller subsystems 110, from one or more robot controller subsystems 230 to one or more other robot controller subsystems 230, from one or more library controller subsystems 110 to one or more other library controller subsystems 110, etc.

Components of the media library system 105 can be implemented in any suitable manner. For example, each described function can be implemented using any suitable one or more components of the system, and specific associations of components with functions should not be construed as limiting the scope of potential implementations. Further, each function can be implemented in various hardware and/or software component(s) and/or module(s), including, but not limited to a circuit, an application specific integrated circuit (ASIC), or processor. The various illustrative logical blocks, modules, circuits, etc. described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As illustrated, embodiments of the library controller subsystem 110 include a spread-spectrum driver 210a (e.g., a modulator/demodulator) and an instruction handler 220. In some implementations, the instruction handler 220 receives user interface commands via a local user interface (e.g., a touchscreen or other interface integrated with the media library system 105) and/or via a remote host system 255 interface via a network 250. The network 250 can include any suitable public and/or private networks, including any suitable wired and/or wireless communications links. The user interface commands can instruct the media library system 105 to perform read/write functions on one or more of the storage media 260, and/or to perform any other suitable functions. Embodiments of the instruction handler 220 can generate instructions for controlling operations of the robot controller subsystem(s) 230 in accordance with the received user interface commands.

Embodiments of the spread-spectrum driver 210a can generate coordinated-spread spectrum, frequency shift keying (FSK) signals for communicating the instructions over one or more communications paths to the robot controller subsystems 230. For example, the spread-spectrum driver 210a can modulate the instructions into a signal according to a spread-spectrum carrier signal. As described herein, the spread spectrum driver can include a sequence of frequencies in one or more bands, according to a spread-spectrum schema. The schema can be stored in memory of the library controller subsystem 110, generated according to a predetermined algorithm, etc. The schema can further be pre-stored at the robot controller subsystem(s) 230, communicated (or otherwise indicated) prior communicating the instruction signal (e.g., as part of a negotiation or handshake protocol with the robot controller subsystem(s) 230), encoded in the instruction signal (e.g., in packet headers and/or other metadata). etc. The spread-spectrum driver 210a can transmit the FSK signal (the spread-spectrum FSK signal) to the robotic controller subsystem via a communications link.

As described above, the communications link can be any suitable link for providing communications (e.g., and power) to the robot controller subsystem(s) 230. The communications link is illustrated as bus 245 (e.g., a 48 VDC rail system), but implementations are not intended to be limited to any particular type of bus, or even to a bus at all. For the sake of illustration, in some tape storage libraries, one or more power supplies 140 power robot(s) 140 via power and ground conductors of one or more busses 245, which may be oppositely charged conductive layers of a power strip, or the like. The library controller subsystem 110 can use processor and logic circuits to generate signals for use in controlling the movement and operations of the robot(s) 140, as driven by respective robot controller subsystem(s) 230. Communication signals can be combined with power signals in any suitable manner. For example, the power signals can typically be lower frequency signals, and the instruction signals can typically be higher frequency signals; so that the power signal can be filtered out by the robot controller subsystem(s) 230 (e.g., using high-pass filters and/or other circuitry) to recover the instruction signals. Such techniques can implement high-speed, full-duplex communications between the library controller subsystem(s) 110 and the robot controller subsystem(s) 230 (e.g., without relying on multiple conductors, cabling, wireless connections, etc.).

The communications (e.g., power and/or instructions) are received via the bus 245 (or any other suitable communications link) by the robot controller subsystem(s) 230. As illustrated, each robot controller subsystem 230 can include one or more robots 140 and a spread-spectrum driver 210b. In some implementations, the spread-spectrum driver 210b is substantially identical, and/or performs substantially identical functions as, the spread-spectrum driver 210a of the library controller subsystem 110. For example, the spread-spectrum driver 210b is a spread-spectrum modulator/demodulator. In some embodiments, spread-spectrum driver 210b can track the spread-spectrum carrier signal to determine the spread-spectrum schema used to communicate the signals. For example, the schema can be stored at the spread-spectrum driver 210 (e.g., hard-coded into programmable logic, stored in an on-board storage device, etc.), and tracking can involve identifying the schema from local information in a manner that permits tracking of the carriers of the received signal (e.g., synchronizing, etc.). Alternatively, the tracking can involve negotiating the schema prior to communicating the instructions (e.g., using handshaking or other protocols), parsing the received data to derive the schema (e.g., parsing the packet headers or other metadata of the communication, which can include an indication of the schema), etc. In some implementations, the spread-spectrum driver 210b (or any other demodulation in the library) can be implemented with enough bandwidth to be able to demodulate the spread-spectrum signals without being aware of, or deriving, a spread spectrum schema used to transmit the signal. For example, the demodulator is configured to receive the signal concurrently across a large enough band of frequencies to avoid tuning to particular carriers or patterns.

Having tracked the signal according to the tracked spread-spectrum schema (i.e., by following the spread-spectrum carriers), the spread-spectrum driver 210b can receive the FSK signal via the communications link by the robotic controller in a manner that is coordinated with the transmission of the signal by the library controller subsystem 110. The spread-spectrum driver 210b can demodulate the FSK to recover the instruction data. For example, as described herein, signals received in a first carrier band (or according to a first pattern) can be associated with a logical '0', and signals received in a second carrier band (or according to a second pattern) can be associated with a logical '1'. The recovered instruction data can then be carried out by the receiving robot controller subsystem 230. For example, the receiving robot controller subsystem 230 can direct one or more robot(s) 140, in accordance with the recovered instruction data, to ferry storage media between at least one media cell and at least one media drive (and/or to perform other functions, like auditing media drives, etc.). As used herein, ferrying storage media between at least one media cell and at least one media drive (or between media cells and media drives, or the like) is intended to broadly include any typical robotic movements in the library, such as ferrying storage media from a media cell to a media drive, from a media cell to another media cell, from a media drive to another media drive, etc.; moving the robot to locations in the library to audit or read contents of a media cell, to identify an installed component, etc.; etc.

In some implementations, both (or all) of the spread-spectrum drivers 210 (i.e., those in the library controller subsystem(s) 110 and the robot controller subsystem(s) 230) can include modulator and demodulator functionality. In such implementations, the robot controller subsystem(s) 230 can encode feedback information and/or other data in a manner that is similar or identical to the encoding performed by the library controller subsystem(s) 110, as described above. Accordingly, the library controller subsystem(s) 110 can decode the feedback information and/or other data from the robot controller subsystem(s) 230 in a manner that is similar or identical to the decoding performed by the robot controller subsystem(s) 230, as described above.

In some implementations, the spread-spectrum drivers 210 are implemented as programmable logic (e.g., a field-programmable gate array, FPGA). The programmable logic can include a phase-lock loop (PLL) or other signal control system for controlling the modulation and demodulation frequencies of the transmitting and receiving spread-spectrum drivers 210, respectively, thereby implementing the spread-spectrum schema. For example, the programmable logic in the spread-spectrum driver 210a of the library controller subsystem 110 can adjust the transmission frequency of an on-board PLL to effectively control the carrier frequency of the transmission modulator; and the spread-spectrum driver 210b of the receiving robot controller subsystem 230 can adjust a center frequency of an on-board band-pass filter (e.g., by presenting a variable resistance to a tuned tank circuit) of the receiving demodulator.

Figure 3:
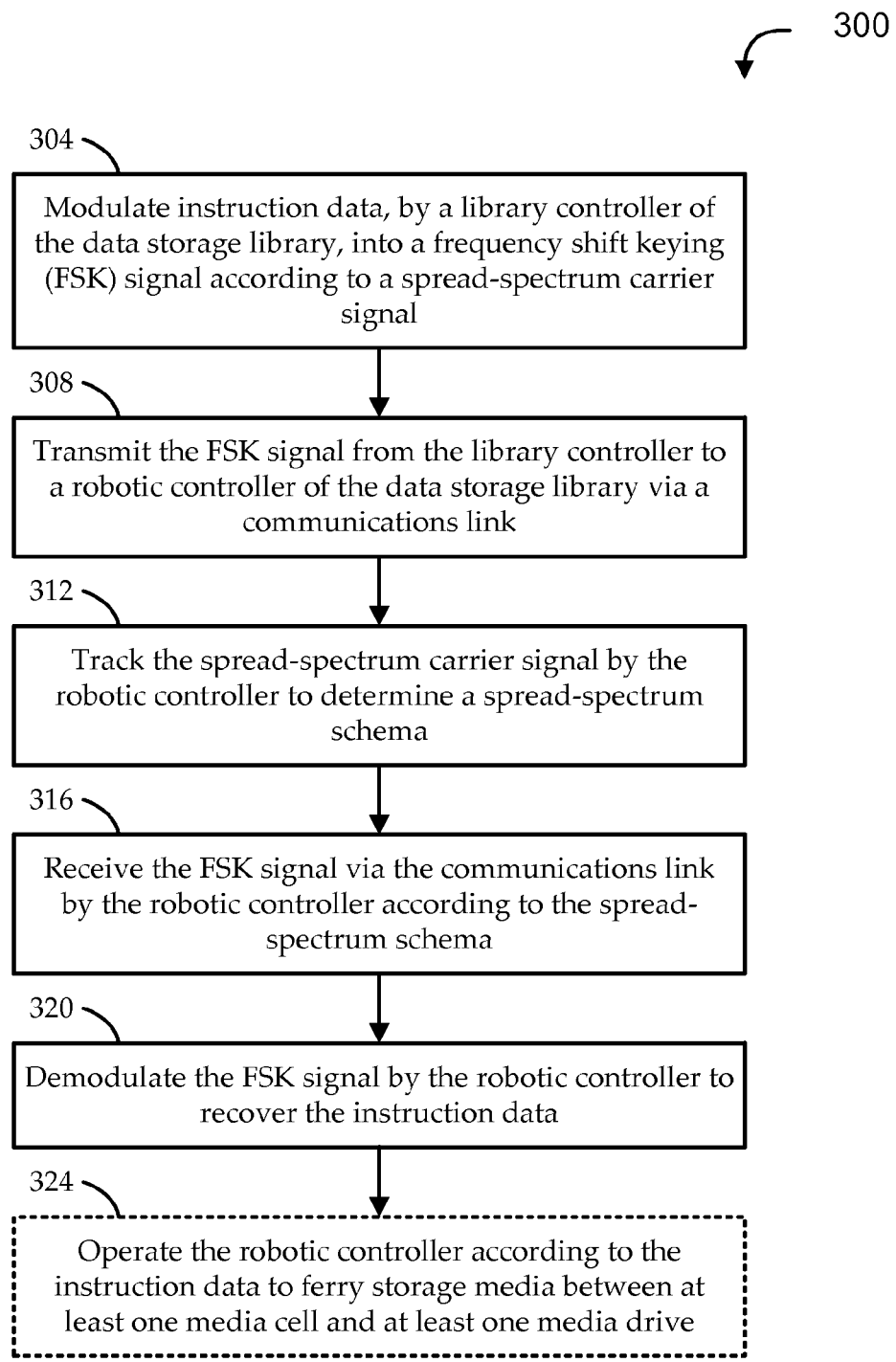
FIG. 3 shows a flow diagram of an illustrative method for improving electromagnetic compatibility of a media library, according to various embodiments.

FIG. 3 shows a flow diagram of an illustrative method 300 for improving electromagnetic compatibility of a media library, according to various embodiments. Embodiments of the method 300 can operate in context of any suitable media storage library system, such as the media library systems 105 described with reference to FIGS. 1 and 2. Embodiments begin at stage 304 by modulating instruction data, by a library controller of the data storage library, into a frequency shift keying (FSK) signal according to a spread-spectrum carrier signal. For example, binary instruction data is translated into the FSK signal by converting all logic '0's to a first carrier level (e.g., 5.5 MHz) and converting all logic '1's to a second carrier level (e.g., 6.6 MHz). Each carrier frequency can then be spread onto a carrier band according to a spread-spectrum schema. For example, the first carrier can be spread over a range from 5.4 to 5.6 MHz, and the second carrier can be spread over a range from 6.5 to 6.7 MHz; and the spreading can be implemented by stepping through or jumping among a sequence of frequencies spread over each respective range, and/or according to any other suitable schema.

At stage 308, the FSK signal can be transmitted from the library controller to a robotic controller of the data storage library via a communications link. For example, the transmission can be communicated over one or more cables, conductive rails, etc. In some implementations, the communication is over a direct current (DC) rail that also provides power to the robot(s) of the data storage library.

At stage 312, the robotic controller can track the spread-spectrum carrier signal to determine the spread-spectrum schema. In some implementations, the tracking involves the robotic controller identifying previous information regarding the spread-spectrum controller. For example, the robotic controller can be hard-coded with the spread-spectrum schema, such that its receiver automatically tracks the sequence of frequencies used by the transmission. In other implementations, the tracking involves negotiating the schema prior to communicating the instructions (e.g., using handshaking or other techniques). In still other implementations, the tracking involves parsing the received data to derive the schema (e.g., the packet headers of the communication include an indication of the schema. Depending on the type of tracking, implementations may or may not use a spread-spectrum schema that defines a fixed pattern (e.g., the pattern may change over time, based on the transmitter, based on the type of communication, etc.).

At stage 316, the FSK signal can be received via the communications link by the robotic controller according to the tracked spread-spectrum schema (i.e., by following the spread-spectrum carriers). The FSK signal can then be demodulated by the robotic controller at stage 320 to recover the instruction data. For example, signals received in a first carrier band (or according to a first pattern) can be associated with a logical '0', and signals received in a second carrier band (or according to a second pattern) can be associated with a logical '1'. In some embodiments, at stage 324, the robotic controller can operate according to the recovered instruction data to ferry storage media between at least one media cell and at least one media drive.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A data storage library system comprising:
   a library controller subsystem that operates to direct operation of a robotic controller subsystem according to instructions,
   the library controller subsystem comprising a transmitter driver that operates to:
      modulate the instructions into a frequency shift keying (FSK) signal according to a spread-spectrum carrier signal; and
      transmit the FSK signal to the robotic controller subsystem via a communications link.

2. The data storage library system of claim 1, further comprising a robotic controller subsystem that operates to ferry a plurality of storage media between media cells and media drives, the robotic controller subsystem comprising a receiver driver that operates to:
   track the spread-spectrum carrier signal to determine a spread-spectrum schema;
   receive the FSK signal via the communications link according to the spread-spectrum schema; and
   demodulate the FSK signal to recover the instructions.

3. The data storage library system of claim 2, wherein:
   the spread-spectrum schema defines a carrier frequency pattern; and
   the transmitter driver and the receiver driver are coordinated to synchronously step through the carrier frequency pattern when communicating.

4. The data storage library system of claim 2, wherein the robotic controller subsystem operates to track the spread-spectrum carrier signal by parsing a packet header of the FSK signal, the packet header indicating the spread-spectrum schema.

5. The data storage library system of claim 2, wherein:
the robotic controller subsystem comprises a robot that operates to ferry the storage media between the media cells and the media drives by traveling along a conductive rail; and
the communications link comprises the conductive rail.

6. The data storage library system of claim 1, wherein:
the spread-spectrum carrier signal comprises a bandwidth sized to exceed a predefined electromagnetic interference detector bandwidth.

7. The data storage library system of claim 1, wherein:
transmitting the FSK signal to the robotic controller subsystem via the communications link produces electromagnetic interference (EMI); and
the spread-spectrum carrier signal comprises a bandwidth sized to reduce power spectral density (PSD) of the EMI to below a predefined maximum PSD.

8. The data storage library system of claim 1, wherein the communications link comprises a direct current (DC) bus.

9. A method for improving electromagnetic compatibility of a data storage library, the method comprising:
modulating instruction data, by a library controller of the data storage library, into a frequency shift keying (FSK) signal according to a spread-spectrum carrier signal;
transmitting the FSK signal from the library controller to a robotic controller of the data storage library via a communications link;
tracking the spread-spectrum carrier signal by the robotic controller to determine a spread-spectrum schema;
receiving the FSK signal via the communications link by the robotic controller according to the spread-spectrum schema; and
demodulating the FSK signal by the robotic controller to recover the instruction data.

10. The method of claim 9, further comprising:
operating the robotic controller according to the instruction data to ferry storage media between at least one media cell and at least one media drive.

11. The method of claim 9, wherein:
the spread-spectrum schema defines a carrier frequency pattern; and
the tracking comprises stepping through the carrier frequency pattern synchronously with the library controller.

12. The method of claim 9, wherein the tracking comprises parsing a packet header of the FSK signal to derive the spread-spectrum schema.

13. The method of claim 9, wherein modulating the instruction data according to the spread-spectrum carrier signal comprises spreading the carrier signal over a bandwidth sized to exceed a predefined electromagnetic interference detector bandwidth.

14. The method of claim 9, wherein:
transmitting the FSK signal to the robotic controller via the communications link produces electromagnetic interference (EMI); and
modulating the instruction data according to the spread-spectrum carrier signal comprises spreading the carrier signal over a bandwidth sized to reduce power spectral density (PSD) of the EMI to below a predefined maximum PSD.

15. The method of claim 9, wherein the communicating comprises communicating the FSK signal over a direct current (DC) bus.

16. The method of claim 9, wherein:
the robotic controller directs movement of a robot that operates to ferry the storage media between the media cells and the media drives by traveling along a conductive rail; and
the communicating comprises communicating the FSK signal over the conductive rail.

17. A data storage library system comprising:
a library controller comprising:
a non-transient data store having first instructions stored thereon; and
a processor that operates to execute the first instructions to direct operation of a robotic controller of a data storage library by performing steps comprising:
receiving second instructions;
modulating the second instructions into a frequency shift keying (FSK) signal according to a spread-spectrum signal that follows a predefined spread-spectrum schema; and
transmitting the FSK signal to the robotic controller via a direct current (DC) communications link.

18. The data storage library system of claim 17, wherein the data store is a first data store, and the processor is a first processor, and further comprising:
the robotic controller comprising:
a second non-transient data store having third instructions stored thereon; and
a second processor that operates to execute the third instructions to perform steps comprising:
receiving the FSK signal via the communications link according to the spread-spectrum schema;
demodulating the FSK signal to recover the second instructions; and
operating a robot according to the second instructions to ferry storage media between at least one media cell and at least one media drive.

19. The data storage library system of claim 18, wherein the spread-spectrum schema is stored in the first data store and in the second data store.

20. The data storage library system of claim 18, wherein the second processor operates to execute the third instructions to perform steps further comprising:
tracking the spread-spectrum carrier signal to determine the spread-spectrum schema prior to the demodulating.

* * * * *